United States Patent [19]

Kasahara

[11] Patent Number: 5,038,385
[45] Date of Patent: Aug. 6, 1991

[54] AREA FILLING METHOD FOR FILLING AN INSIDE PORTION OF A RASTER GRAPHIC OBTAINED BY DEVELOPING A BINARY GRAPHIC DESCRIBED BY DIRECTION CODES

[75] Inventor: Tatsuo Kasahara, Yokohama, Japan

[73] Assignee: Ricoh Company, Ltd., Japan

[21] Appl. No.: 405,121

[22] Filed: Sep. 11, 1989

[30] Foreign Application Priority Data

Sep. 14, 1988 [JP] Japan ................... 63-228430

[51] Int. Cl.⁵ ............................................. G06K 9/00
[52] U.S. Cl. ...................................... 382/22; 340/747; 340/703; 340/728
[58] Field of Search .................. 382/22; 340/747, 703, 340/728

[56] References Cited

U.S. PATENT DOCUMENTS

| | | | |
|---|---|---|---|
| 4,392,120 | 7/1983 | Mita et al. | 382/22 |
| 4,425,559 | 1/1984 | Sherman | 340/703 X |
| 4,547,895 | 10/1985 | Mita et al. | 382/22 X |
| 4,646,076 | 2/1987 | Wiedenman et al. | 340/728 X |
| 4,656,507 | 4/1987 | Greaves et al. | 340/728 X |
| 4,745,575 | 5/1988 | Hawes | 340/744 X |
| 4,754,488 | 6/1988 | Lyke | 340/747 X |
| 4,763,119 | 8/1988 | Matsubara et al. | 340/728 X |
| 4,908,872 | 3/1990 | Toriu et al. | 382/22 |
| 4,947,158 | 8/1990 | Kanno | 340/747 |

Primary Examiner—Kenneth A. Wieder
Assistant Examiner—Glenn W. Brown
Attorney, Agent, or Firm—Mason, Fenwick & Lawrence

[57] ABSTRACT

An area filling method develops a binary graphic which has a contour described by direction codes of black picture elements into a raster graphic and fills an inside portion of the raster graphic by a raster scan. The area filling method prepares a start position table which defines area filling start positions for each of the direction codes. Then, a region of the binary graphic is scanned in a predetermined direction starting from an area filling start position, which region includes a black picture element which constitutes the contour. Each scanned white picture elements within the region is marked as a first type picture element and a black picture element which is scanned first within the region is marked as a second type picture element. An area filling start position which corresponds to a direction code of the second type picture element is obtained by referring to the start position table, and the region is successively moved with respect to all black picture elements which constitute the contour. A raster scan is made to fill an area based on the first and second type picture elements which are obtained with respect to the contour.

13 Claims, 3 Drawing Sheets

FIG. 1
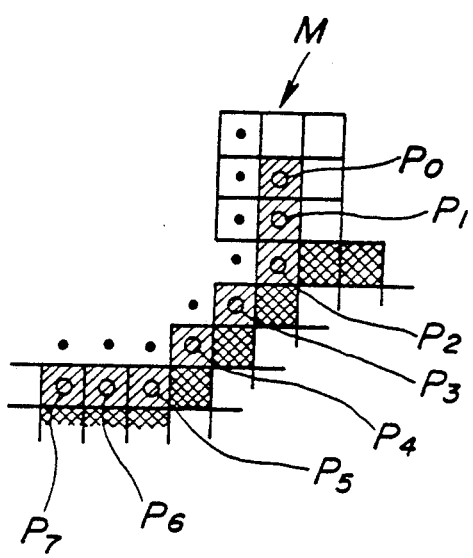
FIG. 2
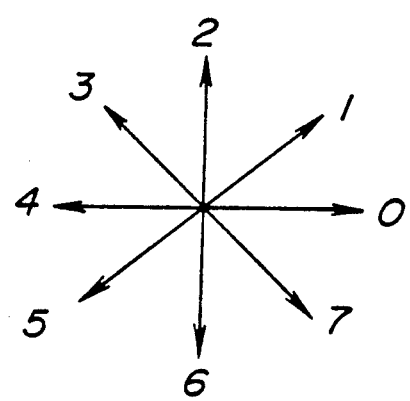
FIG. 3
| $M_3$ | $M_2$ | $M_1$ |
| --- | --- | --- |
| $M_4$ |  | $M_0$ |
| $M_5$ | $M_6$ | $M_7$ |

AREA FILLING METHOD FOR FILLING AN INSIDE PORTION OF A RASTER GRAPHIC OBTAINED BY DEVELOPING A BINARY GRAPHIC DESCRIBED BY DIRECTION CODES

BACKGROUND OF THE INVENTION

The present invention generally relates to area filling methods, and more particularly to an area filling method which develops a binary graphic having a contour thereof described by direction codes into a raster graphic and fills the inside of the raster graphic.

When developing a binary graphic which has the contour thereof described by direction codes into an original graphic and filling the inside of the original graphic, the binary graphic is generally developed into a raster graphic prior to the area filling.

However, a conventional area filling method regards a distance from one black picture element to a next black picture element as one segment and fills this segment by a raster scan. For this reason, it is impossible to carry out the area filling with respect to a segment having a width of one picture element. Accordingly, the areas which are to be filled must first be categorized into the segments having the width of one picture element and the segments having a width greater than one picture element, and the area filling is separately carried out with respect to the two kinds of segments. The area filling is completed by taking a logical sum (OR) of the results of the area filling which is carried out with respect to the two kinds of segments. But according to this conventional area filling method, there is a need to categorize the areas into two kinds after the binary graphic is developed into the raster graphic. As a result, there are problems in that the area filling process is complex because of the need to independently process the two kinds of areas and the area filling process cannot be carried out at a high speed.

SUMMARY OF THE INVENTION

Accordingly, it is a general object of the present invention to provide a novel and useful area filling method in which the above described problems are eliminated.

Another and more specific object of the present invention is to provide an area filling method for developing a binary graphic which has a contour described by direction codes of black picture elements into a raster graphic and for filling an inside portion of the raster graphic by a raster scan, where each black picture element which constitutes the contour has a direction code which indicates a direction in which an adjacent black picture element of the contour exists, and the area filling method comprises the steps of preparing a start position table which defines area filling start positions for each of the direction codes, scanning a region of the binary graphic in a predetermined direction starting from an area filling start position, the region including a black picture element which constitutes the contour, marking each scanned white picture element within the region as a first type picture element and a black picture element which is scanned first within the region as a second type picture element, obtaining an area filling start position which corresponds to a direction code of the second type picture element by referring to the start position table, successively moving the region with respect to all black picture elements which constitute the contour, and making a raster scan to fill an area based on the first and second type picture elements which are obtained with respect to the contour. According to the area filling method of the present invention, the area filling process is simple and may be carried out at a high speed, because there is no need to categorize the segments as in the case of the conventional area filling method.

Still another object of the present invention is to provide an area filling method wherein the step of making the raster scan fills the area by starting each raster scan from a second type picture element of a pair of first and second type picture elements and ending each raster scan at a second type picture element of a pair of second and first type picture elements. According to the area filling method of the present invention, it is possible to automatically restore a binary graphic which has a style of penmanship identical to that of the original binary graphic.

A further object of the present invention is to provide an area filling method wherein the step of making the raster scan fills the area depending on starting and ending positions of each raster scan which are determined by an arbitrary combination of either one of a pair of first and second type picture elements and either one of a pair of second and first type picture elements, where the combination determines a style of penmanship of the raster graphic. According to the area filling method of the present invention, it is possible to restore the original binary graphic with a style of penmanship different from that of the original binary graphic.

Other objects and further features of the present invention will be apparent from the following detailed description when read in conjunction with the accompanying drawings.

BRIEF DESCRIPTION OF THE DRAWINGS

FIG. 1 is a diagram showing a portion of a binary graphic for explaining the extraction of a contour using direction codes;

FIG. 2 is a diagram for explaining the direction codes;

FIG. 3 is a diagram showing a mask which is used for assigning the direction codes to each picture element;

DESCRIPTION OF THE PREFERRED EMBODIMENTS

Figure 4:
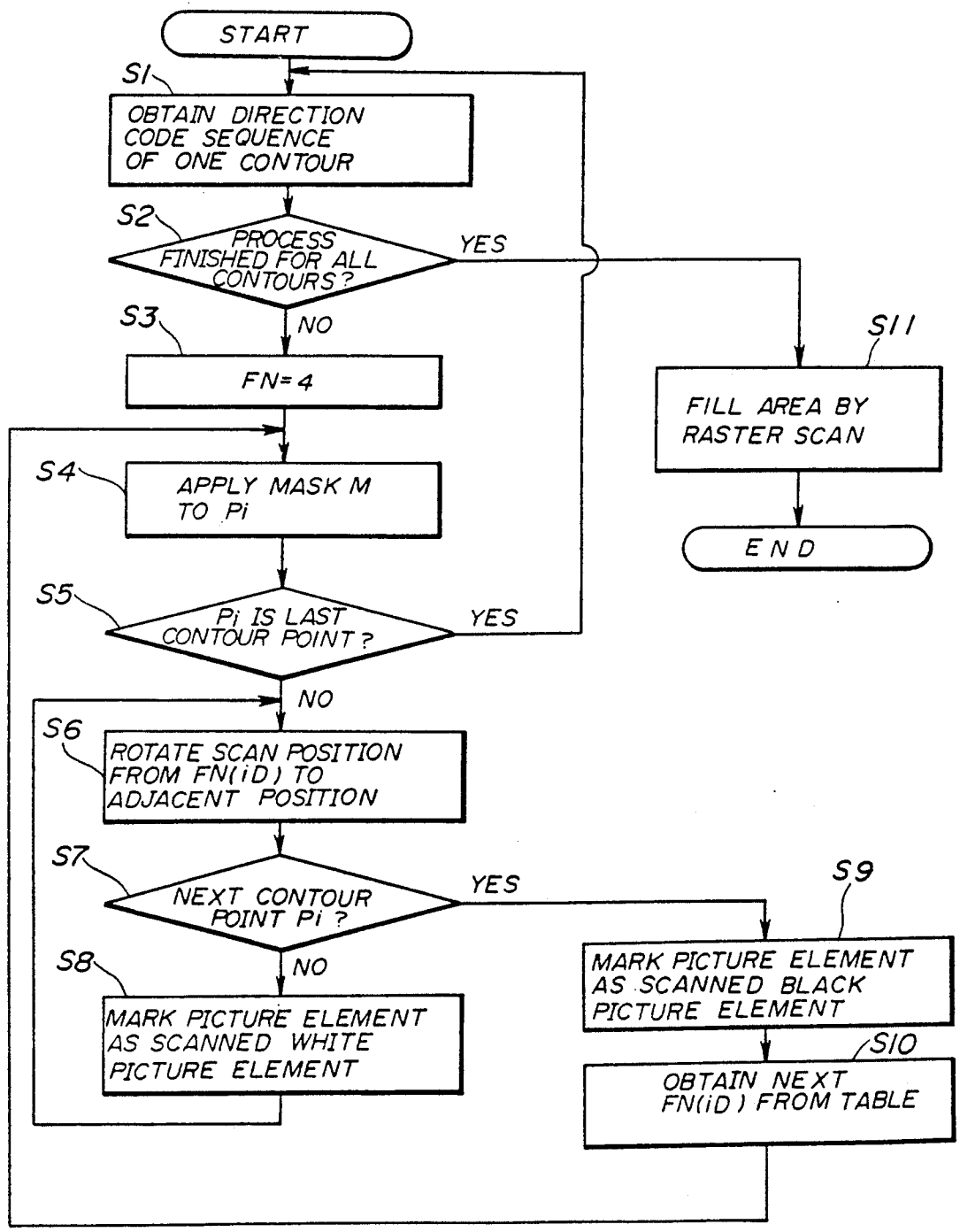
FIG. 4 is a flow chart for explaining an embodiment of an area filling method according to the present invention.

Prior to describing an embodiment of an area filling method according to the present invention, a description will be given of a method of describing a binary graphic using direction codes.

FIG. 1 shows a portion of a binary graphic. It is assumed that eight direction codes $iD = 0, \ldots, 7$ shown in FIG. 2 and a mask M which has a size of $3 \times 3$ picture elements as shown in FIG. 3 are used to describe a contour of the binary graphic. The eight direction codes iD=0, 1, 2, 3, 4, 5, 6 and 7 respectively correspond to east, north-east, north, north-west, west, south-west, south and south-east directions. Similarly, elements M0, M1, M2, M3, M4, M5, M6 and M7 of the mask M respectively correspond to elements located to the east, north-east, north, north-west, west, south-west, south and south-east of a center element of the mask M, and affixes of "M" denote positions of the elements of the mask M. The value of the direction code iD is dependent on one of the eight directions. First, the mask M is applied to a black picture element P0 which is regarded as a starting contour point of the contour extraction, so that a center element of the mask M coincides with the black picture element P0. Picture elements which coincide with elements M0 through M7 of the mask M are successively scanned counterclockwise from a predetermined element, and a black picture element P1 which is first detected is extracted as a next contour point. The direction code iD=6 of the black picture element P0 with respect to the black picture element P1 is obtained from FIG. 2 and is stored as a direction code which describes the contour. At the same time, white picture elements which are scanned by use of the mask M are marked as "scanned white picture element" and the black picture element P1 which is scanned by use of the mask M is marked as "scanned black picture element", and these marking information are also stored.

The above described process is similarly carried out with respect to each of the following black picture elements P1, ..., P7, ... which correspond to the contour points of the binary graphic. As a result, it is possible to extract the contour points P1, ..., P7, ... of the binary graphic as a direction code sequence (6, 6, 5, 5, 5, 4, 4, ...) as shown in the following Table 1. The marking information which indicates whether or not each black picture element and each white picture element is scanned is also stored with respect to each of the picture elements constituting the binary graphic. In FIG. 1, a white picture element which is not yet scanned using the mask M is indicated by a white rectangular mark while a scanned white picture element is indicated by a white rectangular mark with a dot. Similarly, a black picture element which is not yet scanned using the mask M is indicated by a cross hatched rectangular mark while a scanned black picture element is indicated by a single hatched rectangular mark.

TABLE 1

| Contour Point Pi | P0 | P1 | P2 | P3 | P4 | P5 | P6 | P7 | ... |
|---|---|---|---|---|---|---|---|---|---|
| Direction Code iD with respect to Next Contour Point | 6 | 6 | 5 | 5 | 5 | 4 | 4 | | ... |

The area filling method according to the present invention develops the binary graphic which is described by the direction codes iD into a raster graphic and restores the original graphic. A description will now be given of the embodiment of the area filling method according to the present invention by taking the binary graphic shown in FIG. 1 as an example of the binary graphic and the direction codes iD of the Table 1 as the extracted contour information. The direction codes iD of the extracted contour of the binary graphic shown in FIG. 1 are written as a contour code sequence which finally returns to the starting contour point P0. The direction codes iD are assigned counterclockwise in a case where the contour is an outer contour line of the binary graphic and is assigned clockwise in a case where the contour is an inner contour line of the binary graphic.

In this embodiment, an area filling start position FN(iD) of the graphic with respect to the direction codes iD=0, ..., 7 is prepared in advance in a form of a start position table as shown in the following Table 2.

TABLE 2

| Direction Code iD | 0 | 1 | 2 | 3 | 4 | 5 | 6 | 7 |
|---|---|---|---|---|---|---|---|---|
| Area Filling Start Position FN(iD) | 5 | 6 | 7 | 0 | 1 | 2 | 3 | 4 |

FIG. 4 is a flow chart showing the processes of this embodiment. A step S1 obtains direction codes iD of contour points Pi which constitute one contour, and a step S2 discriminates whether or not the process is finished with respect to all contours. In other words, the step S1 obtains the direction code sequence of one contour. When the discrimination result in the step S2 is NO, a step S3 sets the area filling start position FN to an initial value of FN=4 so as to start the area filling process from the starting contour point P0 of the contour.

A step S4 applies the mask M having the size of 3×3 picture elements to each contour point Pi of the contour starting from the starting contour point P0. A step S5 discriminates whether or not the contour point Pi is the last contour point. The process returns to the step S1 when the discrimination result in the step S5 is YES. On the other hand, when the discrimination result in the step S5 is NO, a step S6 moves or rotates the scan position counterclockwise from the area filling start position FN(iD) having the initial value of FN=4 (element M4) to an adjacent picture element position. A step S7 discriminates whether or not a next contour point Pi is reached. When the discrimination result in the step S7 is NO, a step S8 marks the picture element which is located at this adjacent picture element position as a scanned white picture element, and the process returns to the step S6.

On the other hand, when the discrimination result in the step S7 is YES, a step S9 marks the picture element which is located at the adjacent picture element position as a scanned black picture element. For example, the discrimination result in the step S7 becomes YES when the next contour point P1 which is described by the direction code iD=6 of the contour point P0 is reached. A step S10 refers to the start position table shown in the Table 2 and obtains a next area filling start position FN(iD) from the direction code iD of the next contour point, and the process returns to the step S4 so as to repeat the above described process. For example, in the case of the next contour point P1, the step S10 looks up the start position table by the direction code iD=6 of the contour point and obtains FN=3 as the next area filling start position FN(iD).

When the process is finished with respect to one contour which is described by the direction code sequence shown in the Table 1, a direction code sequence of another contour is searched and the process is similarly carried out with respect to this other contour. When the process is finished with respect to all contours, the binary graphic which is described by the direction code sequence shown in the Table 1 is a so-called outline character shown in FIG. 5, for example, which is described by the marking information "scanned black picture element" and "scanned white picture element". In this case, the discrimination result in the step S2 is YES.

Figure 5:
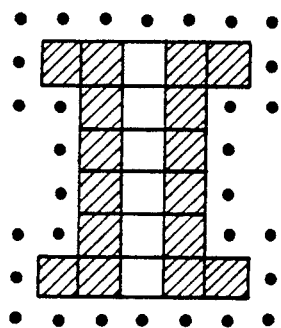
FIG. 5 shows an outline character which is generated by the area filling method according to the present invention.

When the discrimination result in the step S2 is YES, a step S11 fills the inside of the binary graphic which is developed as the outline character shown in FIG. 5 black by making each raster scan from a scanned black picture element of a pair of scanned white and black picture elements to a scanned black picture element of a pair of scanned black and white picture elements. Accordingly, the binary graphic which is described by the direction codes is restored as a binary graphic shown in FIG. 6 which has a style of penmanship identical to the original style of penmanship. The process is ended after the step S11.

Figure 6:
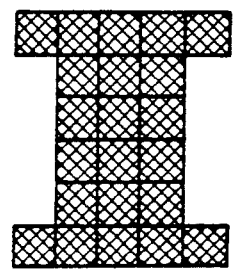
FIG. 6 shows a normal style of penmanship which is obtained by the area filling method according to the present invention.
Figure 7:
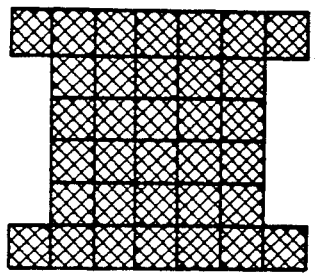
FIG. 7 shows a bold style of penmanship which is obtained by the area filling method according to the present invention.

The binary graphic shown in FIG. 6 is obtained when the scanned black picture element of the pair of scanned white and black picture elements and the scanned black picture element of the pair of scanned black and white picture elements are respectively taken as the starting point and ending point of the area filling process. But as a modification of this embodiment, it is possible to take the scanned white picture element of the pair of scanned white and black picture elements and the scanned white picture element of the pair of scanned black and white picture elements respectively as the starting point and the ending point of the area filling process. In this case, it is possible to obtain a binary graphic shown in FIG. 7 which has a so-called bold style of penmanship.

Figure 8:
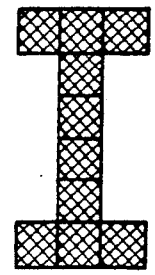
FIG. 8 shows a light style of penmanship which is obtained by the area filling method according to the present invention.

As another modification of this embodiment, it is possible to fill only the area which is surrounded by the scanned black picture elements. In this case, it is possible to obtain a binary graphic shown in FIG. 8 which has a so-called light style of penmanship.

Other modifications of this embodiment are possible by appropriately changing the starting and ending points of the area filling process. In other words, various style of penmanship can be generated by changing the combination of the scanned white picture element and scanned black picture element which are used as the starting and ending points of the area filling process.

In the described embodiment, the black and white picture elements may be reversed. Furthermore, the picture elements which are ON and OFF need not necessarily be black and white and may be any two different arbitrary colors.

Further, the present invention is not limited to these embodiments, but various variations and modifications may be made without departing from the scope of the present invention.

What is claimed is:

1. An area filling method for developing a binary graphic which has a contour described by direction codes of first color picture elements into a raster graphic, and for filling an inside portion of the raster graphic by a raster scan, each first color picture element which constitutes the contour having a direction code which indicates a direction in which an adjacent first color picture element of the contour exists, said area filling method comprising the steps of:
   preparing a direction code and start position table which includes direction codes for next contour points and area filling start positions for each of the direction codes;
   scanning a region of the binary graphic in a predetermined direction starting from an area filling start position, said region including a first color picture element which constitutes the contour;
   marking each scanned second color picture elements within said region as a first type picture element, and a first color picture element which is scanned first within said region as a second type picture element;
   obtaining an area filling start position which corresponds to a direction code of the second type picture element by referring to said direction code and start position table;
   successively moving said region with respect to all first color picture elements which constitute the contour; and
   making a raster scan to fill an area based on the first and second type picture elements which are obtained with respect to the contour.

2. The area filling method as claimed in claim 1 wherein said direction code indicates one of eight possible directions which are east, north-east, north, north-west, west, south-west, south and south-east directions.

3. The area filling method as claimed in claim 2 wherein said direction codes are assigned counterclockwise when the contour is an outer contour line of the binary graphic and is assigned clockwise when the contour is an inner contour line of the binary graphic.

4. The area filling method as claimed in claim 1 wherein said region is defined by a mask which has a rectangular shape and corresponds to a plurality of picture elements, said first color picture element which constitutes the contour and is within said region being located at a center of said mask.

5. The area filling method as claimed in claim 4 wherein said mask corresponds to $N \times N$ picture elements.

6. The area filling method as claimed in claim 5 wherein a value of N is selected to three.

7. The area filling method as claimed in claim 6 wherein said direction code indicates one of eight possible directions which are east, north-east, north, north-west, west, south-west, south and south-east directions respectively assigned with codes 0, 1, 2, 3, 4, 5, 6 and 7, and said mask has elements M0, M1, M2, M3, M4, M5, M6 and M7 respectively located to the east, north-east, north, north-west, west, south-west, south and south-east of a center element of the mask, where affixes of M denote positions of the elements of the mask.

8. The area filling method as claimed in claim 7 wherein said step of preparing the direction code and start position table defines therein starting positions 5, 6, 7, 0, 1, 2, 3 and 4 respectively with respect to the direction codes 0, 1, 2, 3, 4, 5, 6 and 7.

9. The area filling method as claimed in claim 1 wherein said step of making the raster scan fills the area by starting each raster scan from a second type picture element of a pair of first and second type picture elements and ending each raster scan at a second type picture element of a pair of second and first type picture elements.

10. The area filling method as claimed in claim 1 wherein said step of making the raster scan fills the area by starting each raster scan from a first type picture element of a pair of first and second type picture elements and ending each raster scan at a first type picture element of a pair of second and first type picture elements.

11. The area filling method as claimed in claim 1 wherein said step of making the raster scan fills the area depending on starting and ending positions of each raster scan which are determined by an arbitrary combination of either one of a pair of first and second type picture elements and either one of a pair of second and first type picture elements, said combination determining a style of penmanship of the raster graphic.

12. The area filling method as claimed in claim 1 wherein said step of making the raster scan starts each raster scan from a second type picture element of a pair of first and second type picture elements and ending each raster scan at a second type picture element of a pair of second and first type picture elements and fills only an area inside of the second type picture elements which correspond to start and end positions of each scan.

13. The area filling method as claimed in claim 1 wherein said first color picture element is a black picture element and said second color picture element is a white picture element.

* * * * *